United States Patent [19]

Koyama

[11] Patent Number: 5,642,403

[45] Date of Patent: Jun. 24, 1997

[54] PORTABLE TELEPHONE SET TRACKING CONNECTION SYSTEM IN MOBILE COMMUNICATION NETWORK

[75] Inventor: Junichi Koyama, Tokyo, Japan

[73] Assignee: NEC Corporation, Tokyo, Japan

[21] Appl. No.: 393,904

[22] Filed: Feb. 24, 1995

[30] Foreign Application Priority Data

Feb. 25, 1994 [JP] Japan ........................... 6-051091

[51] Int. Cl.$^6$ .......................... H04Q 7/22; H04Q 7/24
[52] U.S. Cl. ........................ 379/58; 379/59; 455/33.1
[58] Field of Search .................. 379/58, 60, 59; 455/33.1, 33.2

[56] References Cited

PUBLICATIONS

Yabusaki et al., "PMT Signaling Protocol", Inst., Elect., Info., and Commun., Eng., A–P92–83, SSE92–75 (1992–10), pp. 43–50.

*Primary Examiner*—William Cumming
*Assistant Examiner*—Nay Maung
*Attorney, Agent, or Firm*—Foley & Lardner

[57] ABSTRACT

A tracking connection system includes a portable telephone set and a plurality of switching units. The portable telephone set receives a calling signal containing a called number and sends a response signal. Each switching unit has a unique management area, in which communication is performed with the portable telephone set, and transmits a calling signal to the portable telephone set present in the management area. Each switching unit includes a memory, a detecting section, and a tracking destination deciding section. The memory serves to store tracking sequence data indicating a sequence for tracking the portable telephone set in advance. The detecting section detects whether the portable telephone set as a calling target is present in the corresponding management area. The tracking destination deciding section decides the switching unit at a tracking destination of the portable telephone set as the calling target on the basis of the tracking sequence data in the memory, when the detecting section does not detect the presence of the portable telephone set.

4 Claims, 4 Drawing Sheets

PORTABLE TELEPHONE SET TRACKING CONNECTION SYSTEM IN MOBILE COMMUNICATION NETWORK

BACKGROUND OF THE INVENTION

The present invention relates to a portable telephone set tracking connection system for tracking movement of a portable telephone set in a mobile communication network constituted by a plurality of switching units.

In general, a mobile communication network of this type is constituted by a plurality of switching units. When a portable telephone set as a moving object moves from one area being managed by a certain switching unit to an adjacent area being managed by another switching unit, the switching unit which manages the area to which the portable telephone set has moved receives a movement notification signal from the portable telephone set.

In this case, the switching unit for managing the area to which the portable telephone set has moved (this unit will be referred to as a visitor location switching unit hereinafter) notifies the switching unit for managing the area from which the portable telephone set has moved (this unit will be referred to as a home location switching unit hereinafter) of the movement of the portable telephone set. Subsequently, the home location switching unit sets the identification data of the visitor location switching unit in the home location register of the home location switching unit. In addition, the home location switching unit transfers information (set in other areas in the home location register) such as the called number of the portable telephone set from which the movement notification has been received to the visitor location register in the visitor location switching unit, thereby performing tracking connection in a calling operation with respect to the portable telephone set which has moved from the area of the home location switching unit to the area of the visitor location switching unit.

Assume that calling processing is to be performed with respect to a portable telephone set which has moved from the area managed by a home location switching unit to the area managed by a visitor location switching unit. In this case, in a conventional portable telephone set tracking connection system in a mobile communication network, since the portable telephone set must transmit a signal notifying the movement to the area of the visitor location switching unit, the processing performed by the portable telephone set is complicated. In addition, location registers must be installed in the respective switching units, and information associated with a portable telephone set which has moved must be transmitted between the home location switching unit and the visitor location switching unit. As a result, the arrangement of the mobile communication network is complicated.

SUMMARY OF THE INVENTION

It is an object of the present invention to provide a portable telephone set tracking connection system in a mobile communication network, in which a portable telephone set need not transmit a movement notification signal.

It is another object of the present invention to provide a portable telephone set tracking connection system in a mobile communication network, which need not install a location register in each switching unit, thereby simplifying the arrangement of the mobile communication network.

In order to achieve the above objects, according to the present invention, there is provided a tracking connection system comprising a portable telephone set for receiving a calling signal containing a called number and sending a response signal, and a plurality of switching units, each having a unique management area, in which communication is performed with the portable telephone set, and transmitting a calling signal to the portable telephone set present in the management area, each of the switching units including memory means for storing tracking sequence data indicating a sequence for tracking the portable telephone set in advance, detecting means for detecting whether the portable telephone set as a calling target is present in the corresponding management area, and tracking destination deciding means for deciding the switching unit at a tracking destination of the portable telephone set as the calling target on the basis of the tracking sequence data in the memory means, when the detecting means does not detect the presence of the portable telephone set.

DESCRIPTION OF THE PREFERRED EMBODIMENT

The present invention will be described below with reference to the accompanying drawings.

Figure 1:
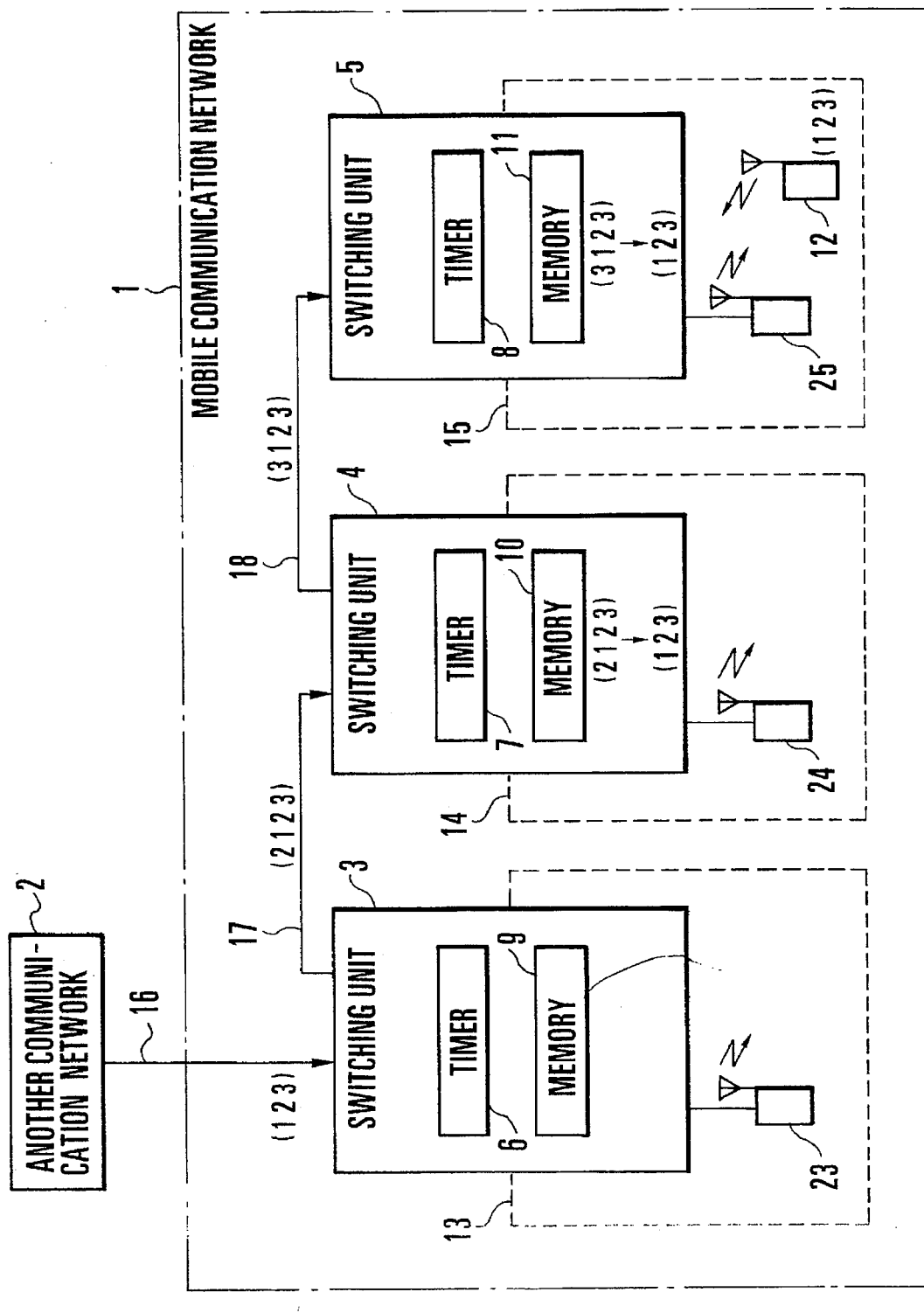
FIG. 1 is a block diagram showing a portable telephone set tracking connection system in a mobile communication network according to an embodiment of the present invention.

FIG. 1 is a block diagram showing a portable telephone set tracking connection system in a mobile communication network according to an embodiment of the present invention. Referring to FIG. 1, reference numeral 1 denotes a mobile communication network, in which a plurality of switching units 3 to 5 are arranged. The switching units 3 to 5 respectively have timers 6 to 8 and memories 9 to 11. Reference numeral 12 denotes a portable telephone set as a moving object; 13 to 15, management areas indicating areas in which the switching units 3 to 5 can respectively manage the portable telephone set 12; 16, a calling route from another communication network 2; 17, a calling transfer route between the switching units 3 and 4; 18, a calling transfer route between the switching units 4 and 5; and 23 to 25, base stations which are respectively connected to the switching units 3 to 5 and perform radio communication with portable telephone sets 12 present in the management areas 13 to 15.

Figure 4:
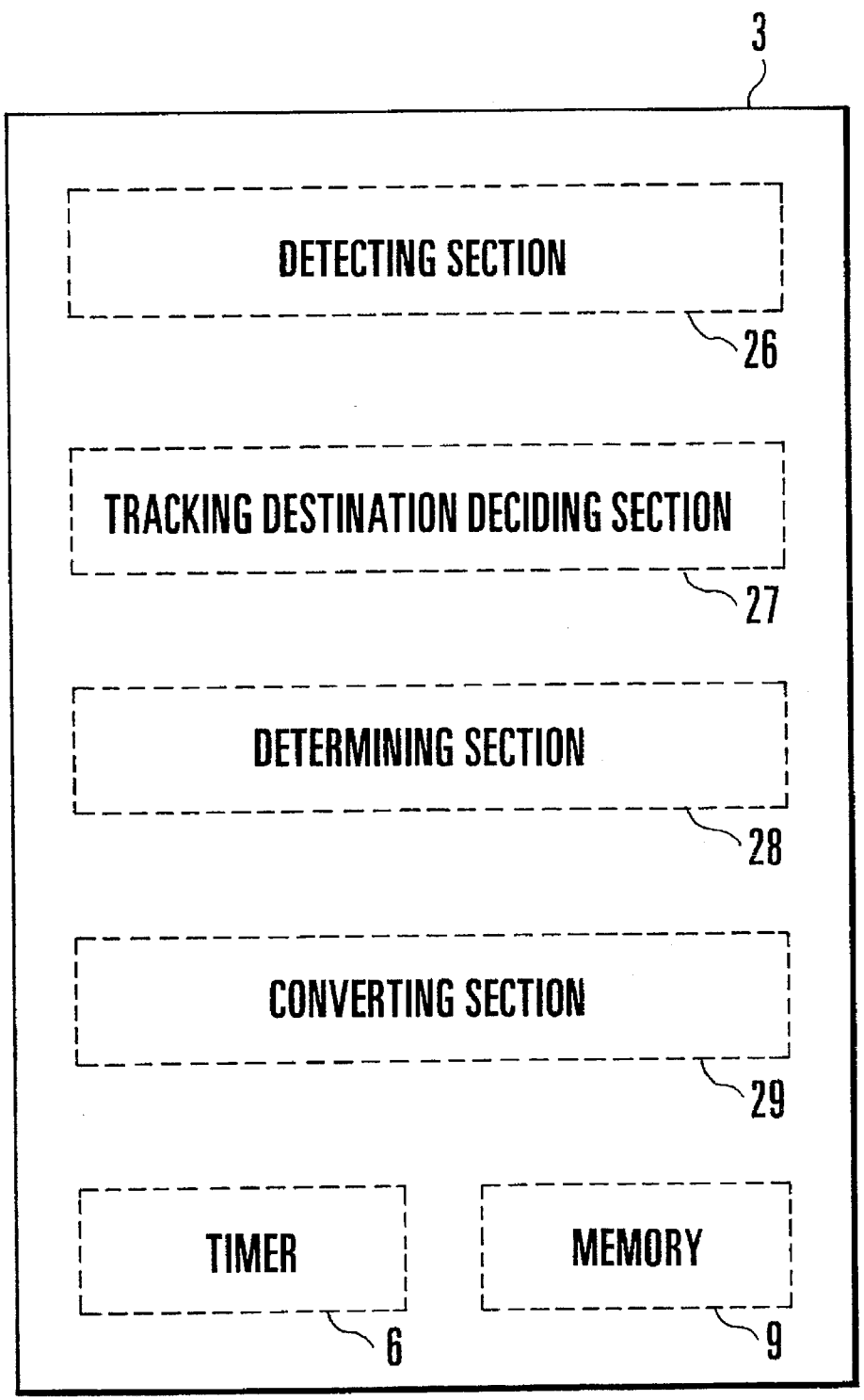
FIG. 4 is a block diagram showing each switching unit in detail.

FIG. 4 is a block diagram showing the detailed arrangement of the switching unit 3 including the timer 6 and the memory 9. Referring to FIG. 4, reference numeral 26 denotes a detecting section for detecting whether the portable telephone set 12 as a calling target is present in the management area; 27, a tracking destination deciding section for deciding one of the switching units 3 to 5 as a tracking destination on the basis of tracking sequence data stored in a subscriber database (to be described later); 28, a determining section for determining whether a received calling signal contains an intra-network number (to be described later); and 29, a converting section for transmitting a calling signal without conversion or a calling signal having undergone conversion from an intra-network number into a called number to a management area on the basis of an output from the determining section 28.

The timers 6 to 8 of the switching units 3 to 5 serve to determine whether the portable telephone set 12 as the calling target is present in the respective management areas 13 to 15. That is, the timers 6 to 8 are started when the switching units 3 to 5 transmit calling signals to the management areas 13 to 15 via the base stations 23 to 25. When a response signal from the portable telephone set 12 is received in response to the transmitted calling signal, the corresponding timer is stopped. When a predetermined period of time has elapsed without receiving any response signal, the operation of the corresponding timer is completed. Each of the memories 9 to 11 of the switching units 3 to 5 has a subscriber database 20 shown in FIG. 2. A tracking sequence for tracking the portable telephone set 12 as the calling target, which is used when the portable telephone set 12 is not present in the management areas 13 to 15, is set in each subscriber database 20.

Referring to FIG. 1, the portable telephone set 12, which belongs to the management area 13 of the switching unit 3 and is called by a called number "123" upon reception of a calling signal via the switching unit 3, has moved to the management area 15 of the switching unit 5.

Figure 2:
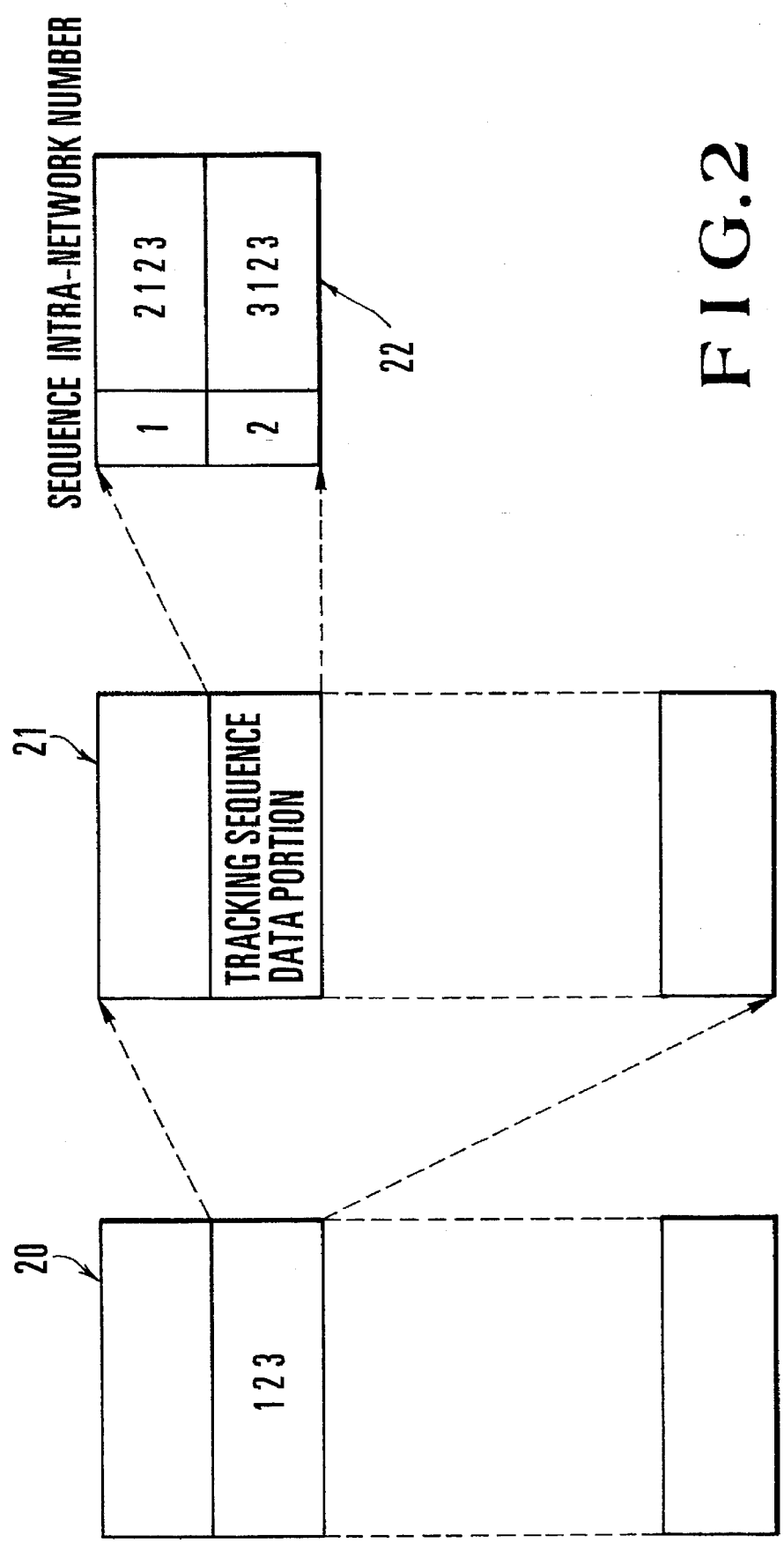
FIG. 2 is a view showing the arrangement of a subscriber database arranged in each switching unit.

FIG. 2 shows the arrangement of the subscriber database 20 arranged in each of the memories 9 to 11. A tracking sequence data portion 22 in which a tracking sequence for tracking the portable telephone set 12 is set is arranged in a subscriber data portion 21 of the subscriber database 20. In this tracking sequence data portion 22 there is stored, tracking sequence data for uniquely determining a specific switching unit from which a calling signal is transmitted to the portable telephone set 12. Note that this tracking sequence data is a number effective only in the mobile communication network 1 and called an intra-network number (=number for identifying switching unit+calling number). In this embodiment, "2123" and "3123" are set, as first and second tracking sequence data, in the tracking sequence data portion 22 there is stored. These tracking sequence data indicate that the portable telephone set 12 having the called number "123" is called in the order of the switching units 4 and 5 corresponding to numbers "2" and "3" for respectively identifying switching units.

The tracking sequence data portion 22, in which such intra-network numbers are set, is arranged in the subscriber data portion 21 in which information unique to the portable telephone set is set. As described above, the subscriber database 20, in which the subscriber data, of each portable telephone set, which includes the information of the subscriber data portion 21, is arranged in each of the memories 9 to 11. That is, identical tracking sequence data are stored in the memories 9 to 11 of the switching units 3 to 5.

Figure 3:
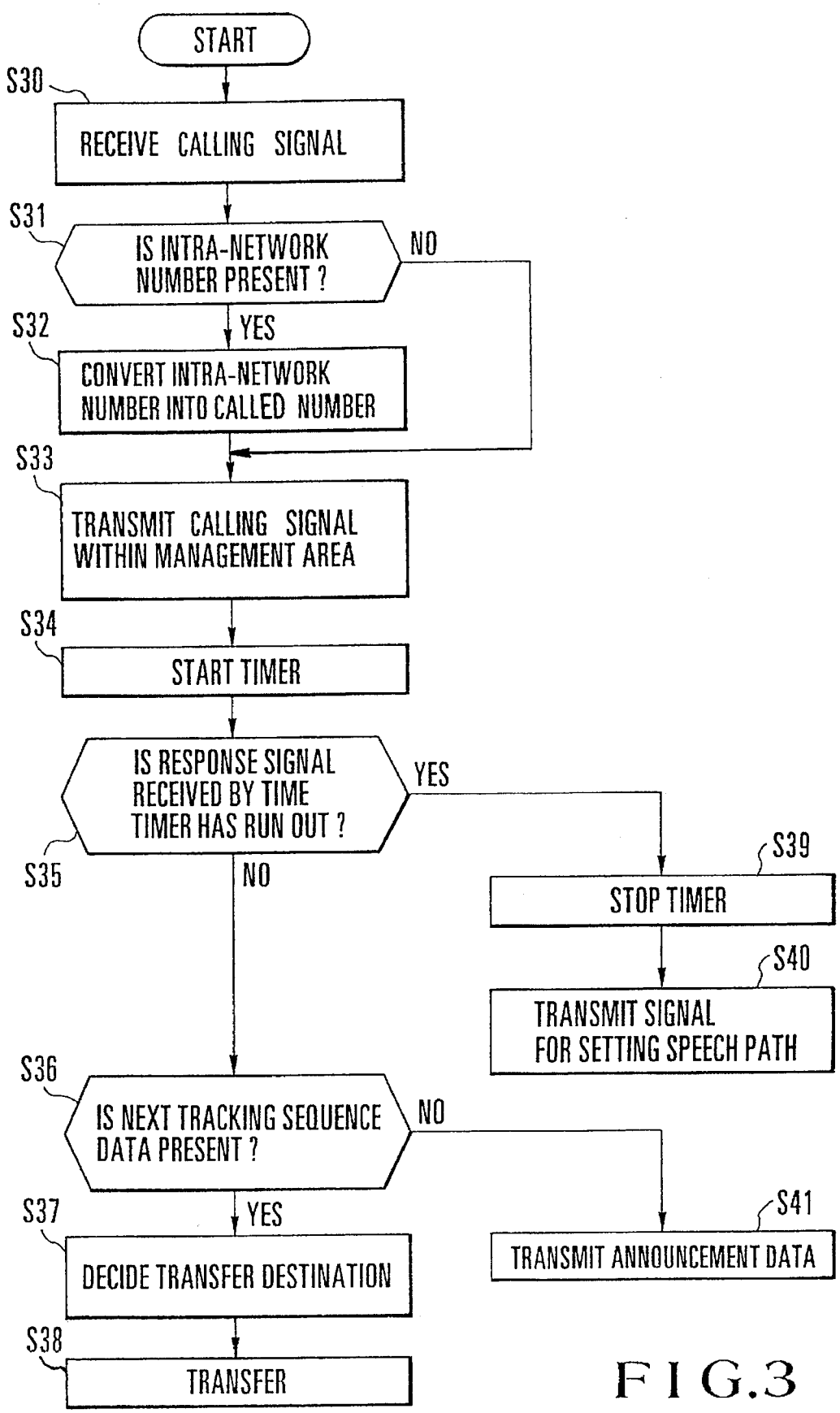
FIG. 3 is a flow chart showing the operation of the tracking connection system.

FIG. 3 is a flow chart showing the operation of the system of this embodiment. The operation of the main part of the system of this embodiment will be described below with reference to this flow chart.

First of all, the switching unit 3 receives a calling signal having the called number "123" for the portable telephone set 12 in the mobile communication network 1 from another communication network 2 via the calling route 16 (step S30). The determining section 28 of the switching unit 3 determines whether an intra-network number is present in the received calling signal (step S31). If no intra-network number is present in the received calling signal, the converting section 29 transmits the calling signal to the management area 13 via the base station 23 without conversion (step S33). At the same time, the timer 6 is started (step S34). The detecting section 26 detects a calling response signal from the portable telephone set 12 by the time the timer 6 runs out (step S35). If no calling response signal is received by the time the timer 6 runs out, it is determined that the portable telephone set 12 is not present in the management area 13. In order to perform a tracking operation subsequently, the tracking destination deciding section 27 determines the presence/absence of the next tracking sequence data by referring to the subscriber database 20 in the memory 9 (step S36), and decides a transfer destination for the calling signal (step S37).

That is, the tracking destination deciding section 27 decides the switching unit 4 as a transfer destination for the calling signal on the basis of the first intra-network number "2123" in the tracking sequence data portion 22 in the subscriber data portion 21 from the subscriber database 20 of the memory 9. Thereafter, the calling signal in which the intra-network number "2123" is set is transferred to the switching unit 4 designated by the intra-network number via the calling transfer route 17 (step S38).

Upon reception of the calling signal from the switching unit 3 (step S30), the determining section 28 of the switching unit 4 determines whether the intra-network number is contained in the calling signal (step S31). In this case, since the intra-network number is contained in the calling signal, the converting section 29 reads out the intra-network number "2123" and converts it into a called number "123" for calling the portable telephone set 12 (step S32). The called signal converted into the calling number is transmitted to the management area 14 via the base station 24 (step S33). At the same time, the timer 7 is started (step S34). The detecting section 26 determines the presence/absence of the portable telephone set 12 in the management area 14 depending on whether a response signal is received from the portable telephone set 12 by the time the timer 7 runs out (step S35).

If the portable telephone set 12 is not present in the management area, the tracking destination deciding section 27 decides the switching unit 5 as a transfer destination for the calling signal on the basis of the second intra-network number "3123" in the tracking sequence data portion 22 in the subscriber data portion 21 from the subscriber database 20 of the memory 10 (steps S36 and S37). Thereafter, the calling signal having the intra-network number "3123" is transferred to the switching unit 5 via the calling transfer route 18.

Upon reception of the calling signal from the switching unit 4 (step S30), the switching unit 5 converts the intra-network number "3123" read from the calling signal into a number "123" for calling the portable telephone set 12 (steps S31 and S32). The converted calling signal is then transmitted to the management area 15 via the base station 25 (step S33). At the same time, the timer 8 is started (step S34). The detecting section 26 determines the presence/absence of a response signal from the portable telephone set 12 by the time the timer 8 runs out (step S35). When a response signal corresponding to the termination signal is received from the portable telephone set 12 during the operation of the timer 8, the timer 8 is stopped (step S39), and a signal for setting a speech communication path for the calling party is transmitted to the portable telephone set 12 (step S40).

If it is determined in step S35 that no response signal is received from the portable telephone set 12 by the time the timer 8 has run out, it is determined that the third intra-network number is not set in the tracking sequence data portion 22 (step S36), and an announcement is performed to notify the calling party that the call cannot be terminated to the portable telephone set 12 (step S41).

As has been described above, according to the present invention, when a call to be terminated to a portable telephone set is generated, it is detected first whether the portable telephone set as a calling target is present, e.g., in the area to which the portable telephone set belongs and which is managed by a predetermined switching unit. If the portable telephone set is not detected, a tracking switching unit for tracking the portable telephone set is decided on the basis of tracking sequence data in the subscriber database. Therefore, the movement of the portable telephone set can be tracked by only the arrangement using a subscriber database as existing equipment without transmitting a movement notification signal from the portable telephone set to each switching unit and without installing any location register in each switching unit.

In addition, since the presence/absence of a portable telephone set is detected by detecting the presence/absence of a response signal a predetermined period of time after a calling signal is transmitted to a management area, the presence/absence of the portable telephone set in the management area can be easily detected.

Furthermore, tracking sequence data and an intra-network number are constituted by the identification number of a tracking switching unit and the called number of a portable telephone set to be tracked, and a tracking switching unit is decided on the basis of this identification number. Therefore, when a calling signal for a portable telephone set is generated, the portable telephone set as a calling target can be tracked/connected with a simple arrangement.

Moreover, when a calling signal containing an intra-network number is received, the intra-network number is converted into a called number to be transmitted, as a calling signal, to a home management area. Therefore, the tracking switching unit can easily transmit the calling signal to a portable telephone set.

What is claimed is:

1. A tracking connection system comprising:

a portable telephone set for receiving a calling signal containing a called number and sending a response signal based on the calling signal; and a plurality of switching units, each having a unique management area, in which communication is performed with said portable telephone set, each of said switching units transmitting the calling signal within the corresponding management area to determine if the portable telephone set is located therein, each of said switching units including, memory means for storing tracking sequence data indicating a sequence for tracking said portable telephone set in advance, detecting means for detecting whether said portable telephone set as a calling target is present in the corresponding management area, and tracking destination deciding means for deciding, when said detecting means does not detect the presence of said portable telephone set, another switching unit as a potential tracking destination of said portable telephone set as the calling target on the basis of the tracking sequence data in said memory means, wherein the tracking sequence data includes an intra-network number which includes an identification number of said switching unit at a particular tracking destination and a called number of said portable telephone set as the calling target, and said tracking destination deciding means decides said another switching unit as the potential tracking destination on the basis of the identification number of the intra-network number read out from said memory means, and transmits the calling signal containing the corresponding intra-network number to said another switching unit, and wherein said another switching unit receives a calling signal containing an intra-network number, said another switching unit converts the received intra-network number into a called number by deleting the identification number of said another switching unit, and transmits the calling signal containing the converted called number to the corresponding management area.

2. A system according to claim 1, further comprising timer means which is started at the same time when the calling signal is transmitted to the management area to count a predetermined period of time, and wherein said detecting means detects the presence of said portable telephone set depending on whether a response signal is received from said portable telephone set as the calling target within the predetermined period of time counted by said timer means.

3. A tracking connection system comprising:

a portable telephone set for receiving a calling signal containing a called number and sending a response signal based on the calling signal; and a plurality of switching units, each having a unique management area, in which communication is performed with said portable telephone set, each of said switching units transmitting the calling signal within the corresponding management area to determine if the portable telephone set is located therein, each of said switching units including, memory means for storing tracking sequence data indicating a sequence for tracking said portable telephone set in advance, detecting means for detecting whether said portable telephone set as a calling target is present in the corresponding management area, tracking destination deciding means for deciding, when said detecting means does not detect the presence of said portable telephone set, another switching unit as a potential tracking destination of said portable telephone set as the calling target on the basis of the tracking sequence data in said memory means, wherein the tracking sequence data includes an intra-network number which includes an identification number of said switching unit at a particular tracking destination and a called number of said portable telephone set as the calling target, and said tracking destination deciding means decides said another switching unit as the potential tracking destination on the basis of the identification number of the intra-network number read out from said memory means, and transmits the calling signal containing the corresponding intra-network number to said another switching unit, determining means for determining whether an intra-network number is contained in a received calling signal, and converting means for transmitting a received calling signal to the corresponding management area without conversion on the basis of an output from said determining means when no intra-network number is contained, and transmitting a calling signal obtained by converting an intra-network number into a called number by deleting the identification number of said another switching unit to the corresponding management area on the basis of the output from said determining means when the intra-network number is contained.

4. A system according to claim 3, further comprising timer means which is started at the same time when the calling signal is transmitted to the management area to count a predetermined period of time, and wherein said detecting means detects the presence of said portable telephone set depending on whether a response signal is received from said portable telephone set as the calling target within the predetermined period of time counted by said timer means.

* * * * *